Dec. 28, 1965  J. A. PORTEOUS  3,225,935
DRAINAGE BED
Filed Jan. 10, 1963  2 Sheets-Sheet 1
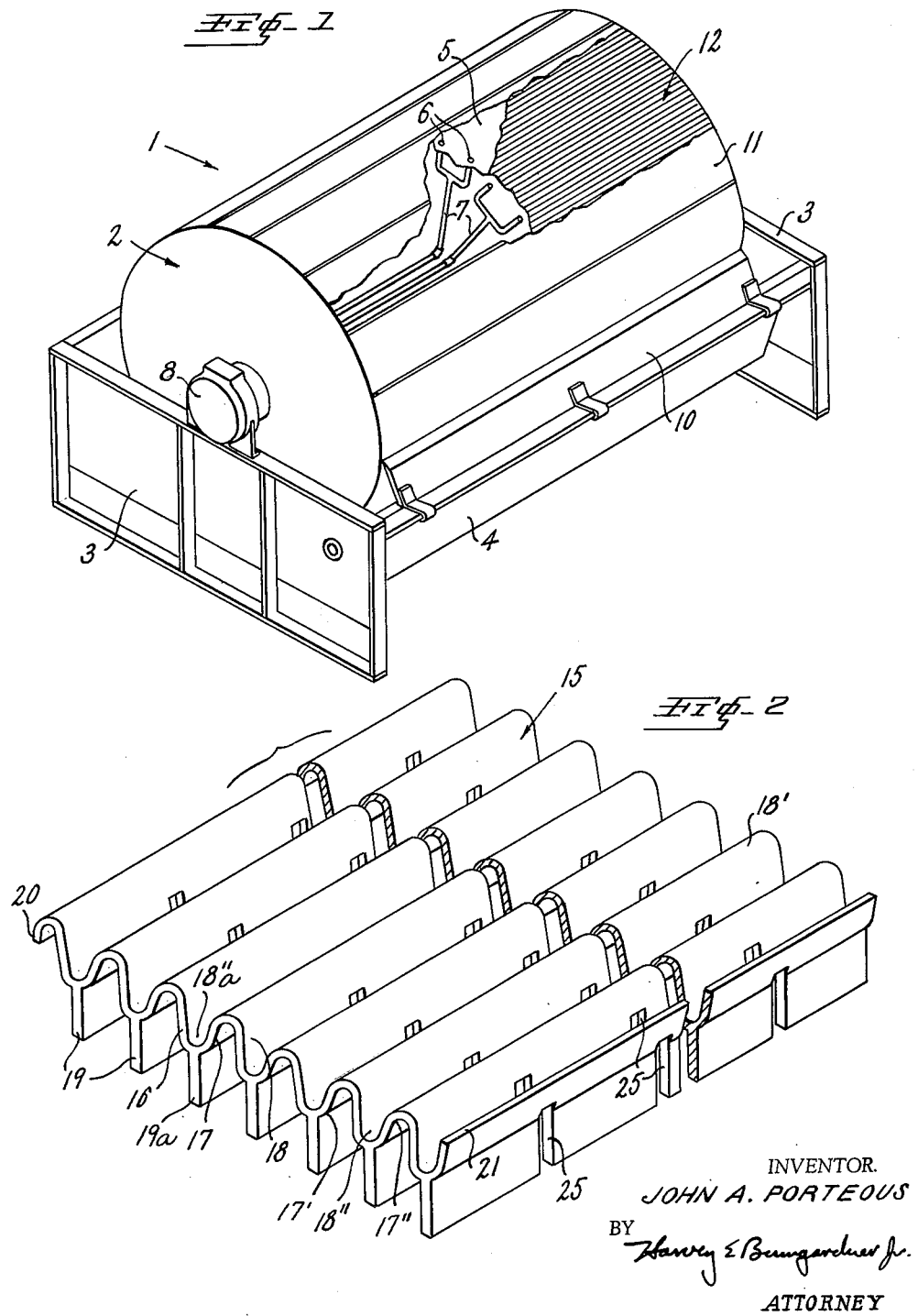
INVENTOR.
JOHN A. PORTEOUS
BY
Harvey E Bumgardner Jr.
ATTORNEY Dec. 28, 1965        J. A. PORTEOUS        3,225,935
DRAINAGE BED
Filed Jan. 10, 1963        2 Sheets-Sheet 2
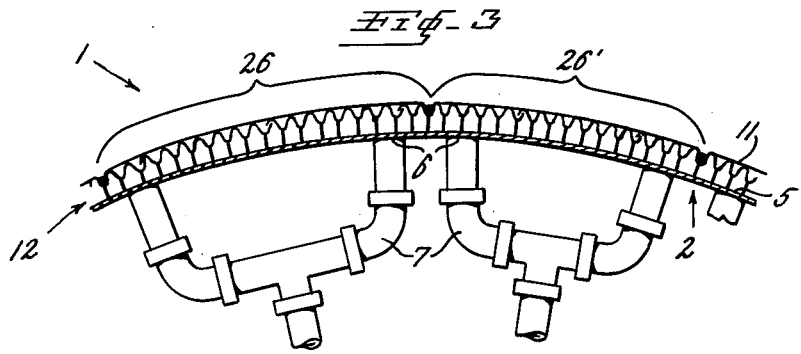
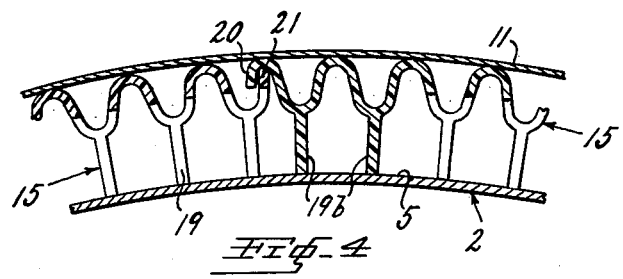
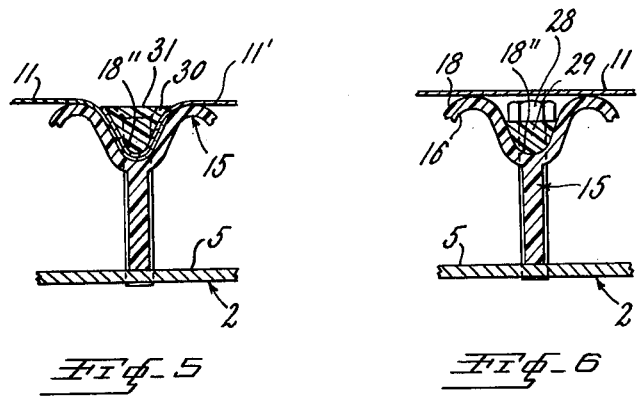
INVENTOR.
JOHN A. PORTEOUS
BY
ATTORNEY United States Patent Office 3,225,935
Patented Dec. 28, 1965

3,225,935
DRAINAGE BED
John A. Porteous, Montreal, Quebec, Canada, assignor to United States Rubber Company, New York, N.Y., a corporation of New Jersey
Filed Jan. 10, 1963, Ser. No. 250,551
8 Claims. (Cl. 210—404)

This invention relates to a novel drainage bed construction for drum filters and the individual drainage grids comprising said drainage bed as well as to the means for interlocking adjacent grids and for providing division strips in said drainage bed.

Drum filters generally in use in the extractive and other industries comprise a rotatable metal drum, on which, exterior to the cylindrical surface thereof, is provided a filtering element such as a suitable cloth. The filtering element is necessarily separated from the exterior surface of the drum by a drainage bed which permits collection and drawing off of the filtrate passing through the filtering element. Conventionally, this drainage bed is divided, by suitable means, into axially extending filter sectors so that each said filter sector and its covering segment of filter element may be successively subjected (by conventional means not forming part of this invention), to vacuum, atmospheric or "neutral" pressure and "blowback," by which means filtrate is drawn through the filtering element, the "cake" is retained on the exterior surface of said element and the cake is ultimately discharged therefrom with the aid of a scraper knife or other suitable means, all of said operations being performed successively and repeatedly with respect to each filter sector of the continuously rotating drum.

Conventionally, drainage beds for drum filters have been comprised of wooden elements or blocks of the type described and illustrated in United States Patents Nos. 1,593,051 and 2,285,894 or of drainage grids molded from hard rubber and some plastic materials having similar properties. Such conventional drainage grids have several material disadvantages. Conventional wooden drainage elements must be individually machined from blocks of wood and, therefore, are usually relatively short (normally not exceeding 4 feet in length), limited in width and expensive to manufacture. They are necessarily somewhat bulky and have a relatively high percentage of area contact with the filtering element, thereby minimizing effective filtering area. Such wooden elements must usually be preconditioned and softened to fit the curvature of the drum during the drainage bed assembly operation. It is necessary to install separate division strips between the wooden drainage elements comprising the desired filter sectors of the drainage bed. The wood tends to soften under constant in-service contact with water or acid solutions, tends to splinter damaging the filtering element and, when out of service for any appreciable time, tends to warp. Also, in the process of filtering many slurries, foreign materials, such as lime or gypsum, tend to precipitate out of solution and build up on the wood. Removal of such materials by immersion in acid tends to make the wood soft and spongy and subject to collapse under vacuum when replaced in the drainage bed. On the other hand, wood grids are especially subject to damage by chipping or scraping operations.

Hard rubber or similar molded plastic grids are also quite expensive to manufacture, mold cost being a substantial factor therein. A separate mold must be provided for each size (length and width) of filter grid. Such grids usually are, therefore, of relatively short length (usualy about 18 inches). For installation in the drainage bed, such rubber grids must be preheated so that they may be fitted to the curvature of the drum, and, in use as well as handling, they are brittle and subject to breakage. As in the case of wooden drainage elements, separate division strips, usually made of expensive rubber-covered metal, are required.

Accordingly, it is an object of this invention to provide a new and improved drainage bed construction for drum filters.

It is a further object of this invention to provide a new and improved drainage grid for installation on drum filters as part of the drainage bed thereof.

It is a still further object of this invention to provide a novel means for dividing and sealing the separate filter sectors of a drum filter drainage bed without the employment of specially designed and separately made division strips between drainage grids.

Other objects and advantages of the present invention will become apparent from the following description when read in conjunction with the accompanying drawings wherein:

FIG. 1 is a schematic isometric view of a typical drum filter with portions of the filtering element, drainage bed and drum surface broken away to illustrate the location and function of the drainage bed of this invention in such a typical filter.

FIG. 2 is an isometric view of a typical filter grid constructed in accordance with this invention.

FIG. 3 is a sectional view through a segment of a drum filter including drum, filtrate piping, drainage bed and filter cloth.

FIG. 4 is a more detailed section through a drainage cut illustrating the interlocked overlapping joint between two adjacent grids and an integral division strip between two adjacent filter sectors of the drainage bed.

FIG. 5 is a sectional detail showing the attachment of caulking strips and filter cloth to the drainage bed and drum.

FIG. 6 is a sectional detail showing means of attachment of a filter grid to the drum at a circumferential location where no caulking strip is required.

Referring now to the drawings, wherein like reference numerals denote corresponding parts throughout the several views, and more particularly to FIG. 1, the typical drum filter 1 shown in this figure comprises a metal drum 2 in the form of a right circular cylinder rotatably mounted, by means of suitable bearings, on two end supports 3 so as to rotate about its cylindrical axis. Mounted beneath the axis of the drum 2 between the end supports 3 in a slurry tank 4 to which is continuously supplied the slurry to be filtered, the slurry level in the tank 4 being maintained at such a level relative to the drum 2 that each point of the circumference of the drum 2 will be submerged in the slurry during a substantial portion of each successive rotation of the drum 2 about its axis. The drum 2 may be rotated by any suitable drive means (not shown) for imparting a substantially constant-speed rotation thereto.

The "lateral" or outside cylindrical surface 5 of the drum 2 is provided, at appropriately spaced intervals, with ports 6 for drawing off the filtrate accumulating adjacent to said surface through the conduits 7 each connected to one or more regularly spaced ports 6 or groups of ports 6. The conduits 7 are connected, at their ends remote from the drum surface 5, to an automatic valve 8 by means of which a vacuum, "neutral" or atmospheric pressure and "blow-back" or compressed air are successively applied to successive conduits 7 as the drum 2 rotates, the vacuum being applied to those conduits 7 communicating with the ports 6 which are, at the time of application of said vacuum, below the slurry level in the tank 4, and blow-back being applied to those conduits 7 communicating with ports 6 which are, at the time of application of said blow-back, located close to the scraper knife 10 which cooperates with the blow-back in removing the cake from the continuously passing filtering surface or element 11 of the filter 1. This filtering element is, most often, comprised of one or more pieces of a suitable cloth made either of textile or wire.

The foregoing elements of the filter 1, as well as various further accessories not shown and not part of this invention, are all in common commercial use and well known in the art. This invention is concerned with the construction of the drainage bed, designated generally as 12, which is interposed between the filtering element or cloth 11 and the outside surface 5 of the drum 2, and has the function of supporting the cloth 11 while providing passages for the filtrate to pass through the cloth 11 and to thereafter flow to the ports 6, blow-back being transmitted from the ports 6 to the cloth 11 by the same passages in reverse direction.

Referring now particularly to FIG. 2, the drainage bed 12 constituting this invention is comprised of a plurality of drainage grids 15 of the general shape shown in FIG. 2, each said grid 15 being of any desired length, usually the length of the drum surface 5. Each such grid 15 is comprised of a corrugated sheet 16 having an inner surface 17 designed, when the grid 15 is installed on the drum 2, to face the drum surface 5, and an outer surface 18 over which the filtering cloth 11 is designed to be installed. The corrugated inner surface 17 defines alternate ridges 17' and grooves 17", while the outer surface 18 also defines alternate ridges 18' and grooves 18" all running the entire length of the grid 15. Joined to each ridge 17' of the inner surface 17 of the corrugated sheet 16 and running, interrupted only as hereinafter described, the entire length of each such ridge 17' is an integral support strip 19 for spacing the corrugated sheet 16 from the drum surface 5. These integral support strips 19 extend substantially perpendicular to the average or composite plane of the corrugated sheet 16 and parallel to the corrugations thereof. When the grid 15 is mounted on the drum surface 5, the support strips 19 extend substantially radially from the drum surface 5 and parallel to the axis of the drum 2.

The edges of the corrugated sheet 16 running parallel to the strips 19 are designed to overlap and interlock with the opposite edges of adjacent identical grids 15. To effect this purpose, one edge 20, designated hereinafter as the "overlapping edge," terminates in an inwardly directed hook-like strip paralleling the corrugations of the sheet 16. This "hook" is formed by providing a groove 17" on the inner surface 17 exterior to the support strip 19 nearest the overlapping edge 20 and terminating the corrugated sheet 16 before the next ridge 17" of the inner surface 17 is reached. The opposite edge 21 of the corrugated sheet 16, designated hereinafter as the "overlapped edge," terminates in an outwardly thrusting strip paralleling the corrugations of the sheet 16, which outwardly thrusting strip is formed by terminating the sheet 16 before a groove 17" on the inner surface 17 has been reached exterior to the support strip 19 adjacent this overlapped edge 21. The interlock is made possible by so positioning the edges 20 and 21 that when two identical grids 15 are placed side-by-side on the drum surface 5, the inner surface 17 of the sheet 16 at the overlapping edge 20 of one grid 15 will overlap the outer surface 18 of the sheet 16 at the overlapped edge 21 of the other grid 15.

As shown in FIG. 2, a plurality of drainage cuts 25 intersect the support strips 19 and part of the corrugated sheet 16 in a direction transverse to the corrugations of the sheet 16 and the support strips 19. These cuts 25 extend, in depth, from the free inner (drum contacting) edge of the support strips 19 well into the grooves 18" on the outer surface 18 of the sheet 16. As shown in FIG. 2, at least one support strip 19a and groove 18"a in the outer surface 18 of the corrugated sheet 16 may be left uncut to provide an integral division strip for the drainage bed 12 as will be more fully described hereinafter.

The grid 15 shown in FIG. 2 can be satisfactorily made by extruding various thermoplastic materials having the desired resistance to attack by the materials in the slurry to be filtered and having a fairly high strength and rigidity while still permitting cold flexing or bending to fit the curvature of the drum surface 5. Materials known as "gum plastics" have been found satisfactory for this purpose. The grids 15 may be inexpensively extruded to any desired length and will usually be extruded to the length of the drainage bed of the filter to which they are to be applied. Consequently grids extending the entire length of the various standard length filters (i.e. from 8 feet to 18 feet) can be provided without expensive long molds. The only machining operation required is the cutting or sawing of the drainage cuts 25. The width, from edge 20 to edge 21 of the grids 15 may also be varied to suit, but a single width grid 15 may be used on all drums, since only the location of the integral division strips formed by not cutting one or more support strips 19 need be varied to suit individual filter requirements.

Referring now especially to FIGS. 3 through 6, the details of mounting a multiplicity of grids 15 on the drum surface 5 to form a complete drainage bed 12 will be described. FIG. 3 shows a segment of a completely assembled drum filter 1 including the filtering cloths 11, drainage bed 12 and conduits 7 associated with two complete adjacent vacuum sectors 26 and 26' of the filter. As shown in this figure, it is not necessary that the width of the grids 15 and the vacuum sectors 26 and 26' correspond. In assembling the drainage bed 12 on the drum surface 5, identical grids (except for drainage cuts 25) are simply fitted edge to edge around the entire circumference of the drum 2. The edges 20 and 21 of adjacent grids 15 are simply overlapped and interlocked as shown in FIG. 4 and the grids are secured to the drum 2 at suitable intervals by bolts 28 as shown in the detail in FIGS. 6, a plastic bearing strip 29 (which may run the length of the drum or may be only a short section) being inserted in each groove 18" on the outer surface 18 of the corrugated sheet 16 of each grid 15 where bolting is to be located. These bearing strips 29 provide surfaces for the bolt heads to bear against when the bolts 28 are tightened up. In the event that the total circumferential distance around the drum 2 cannot be completely covered by an integral number of identical grids 15, then one grid may be cut in an axial direction to provide a new overlapping or overlapped edge defining a narrower grid in order to complete the circumferential coverage of the drum surface 5.

At such intervals as are dictated by the location of the ports 6 communicating with different conduits 7, it will, of course, be necessary to provide division strips to separate the adjacent vacuum sectors such as 26 and 26' from each other. While omitting drainage cuts 25 from a single support strip 19a (as shown in FIG. 2) provides a satisfactory seal between adjacent vacuum sections in most instances, it will occasionally be found desirable to omit the drainage cuts from two (as shown in FIG. 4) or even three adjacent support strips 19b. While this practice results in a somewhat improved vacuum seal, it should be appreciated that it tends to diminish effective filtering area. There appears to be no measurable advantage in omitting the drainage cuts 25 from more than three adjacent support strips 19.

In order to provide a better seal between adjacent vacuum sections, it has also been found to be advantageous in most instances to have caulking strips 30 coincide in location with the integral division strips formed by leaving one or more support strips 19 uncut. A detail of such a caulking strip installation is shown in FIG. 5. The edges of adjacent filter cloth strips 11 and 11' are drawn into the groove 18" and lapped. Then the caulking strip 30 is inserted in the groove 18" on top of the cloth edges and tightly secured to the grid 15 and to the drum 2 by means of the flat headed bolts or machine screws 31.

While this discussion has related to the attachment of grids 15 to the drum surface 5 by means of bolting, it will be appreciated that such grids could be attached by wire wrapping or any other conventional means of attaching grids to drum filters.

It will be observed that the present invention, which includes the drainage grid of FIG. 2 as well as the drainage bed comprised of such grids together with other functionally significant structural features of such a bed, enjoys many advantages over the prior art drainage beds and elements thereof. First, the drainage grids of this invention result, to a manufacturer, vendor or user thereof, in greatly reduced costs of manufacture, dies (molds) and inventory. A single extrusion die will suffice, if desired, to provide grids for all sizes of drum filters, the only supplementary machine operations required being cutting of the grids to length, cutting the drainage cuts as required and, perhaps, a longitudinal cut of one grid per filter.

The flexibility of this drainage grid construction permits manufacture of the grids in wider sections than is feasible with wood or other rigid materials. In many instances it will be found expedient to manufacture grids having widths equal to the widths of the vacuum sectors on the drum. Even when this is not done, the employment of wider grids would still result and fewer units being handled during assembly and disassembly of the drum filter, thereby reducing maintenance down time. This invention, as previously stated, also permits production of grids equal in length to the entire length of the cylindrical exterior surface of my drum, whereas long wooden grids are especially prone to warp, and mold costs for long molded grids are prohibitive.

The need for separate division strips to provide seals between adjacent vacuum sections on the drum may be eliminated by this invention, although the drainage grids described herein would still afford most of the advantages noted herein even if separate division strips were utilized.

It will be noted that the shape and structure of the grid provides a maximum radial compressive strength, the cross section of the grid being substantially equivalent to a series of arches, while maintaining adequate cold flexibility for easy fitting to the curvature of the drum. The shape of the grid also gives maximum effective filtering area without impairing the strength of the grids.

Compared with the grids of the prior art, the structure and material of the grids of this invention is tough, durable, not brittle, and not subject to splintering or warping.

In service, the grids of this invention, which are provided with a smooth, hard surface, do not encourage the build-up of lime or gypsum. Even when such a build-up occurs in mild degree, such foreign materials can be easily removed by soaking the grids in dilute hydrochloric acid without any injury to the grids.

While a preferred form of the invention has been shown and described, it will be appreciated that this is for the purpose of illustration and that modifications and changes may be made therein without departing from the spirit and scope of the invention.

Having thus described my invention, what I claim and desire to protect by Letters Patent is:

1. A one-piece extruded plastic drainage grid for a filter comprising:
   (a) a corrugated sheet having an inner surface and an outer surface, said corrugations defining, on each said surface, alternate parallel ridges and grooves;
   (b) each said ridge on the inner surface of said sheet having an integral planar support strip joined thereto by one of its edges;
   (c) each said support strip having a free opposite edge parallel to its joined edge, all of said support strips being of substantially equal edge-to-edge width and extending parallel to the corrugations of said sheet and perpendicular to the plane of said sheet;
   (d) said grid being intersected by at least one transverse drainage aperture extending in cross-section through at least part of said support strips and through part of said corrugated sheet into said grooves on the outer surface thereof and extending in a transverse direction across at least some of said support strips; and
   (e) said grid being flexible in a direction perpendicular to said corrugations.

2. A one-piece extruded plastic drainage grid for a filter comprising:
   (a) a corrugated sheet having an inner surface and an outer surface, said corrugations defining, on each said surface, alternate parallel ridges and grooves;
   (b) each said ridge on the inner surface of said sheet having an integral planar support strip joined thereto by one of its edges;
   (c) each said support strip having a free opposite edge parallel to its joined edge, all of said support strips being of substantially equal edge-to-edge width and extending parallel to the corrugations of said sheet and perpendicular to the plane of said sheet;
   (d) said grid being intersected by at least one transverse drainage cut extending in depth from the free edges of said support strips outwardly through part of said corrugated sheet into said grooves on the outer surface thereof and extending in a transverse direction across at least some of said support strips; and
   (e) said grid being flexible in a direction perpendicular to said corrugations.

3. A one-piece extruded plastic drainage grid for a filter comprising:
   (a) a corrugated sheet having an inner surface and an outer surface, said corrugations defining, on each said surface, alternate parallel ridges and grooves;
   (b) said sheet having two opposed edges parallel to each other and to said corrugations, said edges being defined by interruptions of said corrugations, one said edge being inwardly directed and the opposite edge being outwardly directed and extending outwardly further than said inwardly directed edge; whereby said inwardly directed edge will overlap the outwardly directed edge of an adjacent identical grid;
   (c) each said ridge on the inner surface of said sheet having an integral planar support strip joined thereto by one of its edges;
   (d) each said support strip having a free opposite edge parallel to its joined edge, all of said support strips being of substantially equal edge-to-edge width and extending parallel to the corrugations of said sheet and perpendicular to the plane of said sheet;
   (e) said grid being intersected by at least one transverse drainage aperture extending in cross-section through at least part of said support strips and through part of said corrugated sheet into said grooves on the outer surface thereof and extending in a transverse direction across at least some of said support strips; and
   (f) said grid being flexible in a direction perpendicular to said corrugations.

4. A one-piece extruded plastic drainage grid for a filter comprising:
   (a) a corrugated sheet having an inner surface and an outer surface, said corrugations defining, on each said surface, alternate parallel ridges and grooves;
   (b) said sheet having two opposed edges parallel to each other and to said corrugations, said edges being defined by interruptions of said corrugations, one said edge being inwardly directed and the opposite edge being outwardly directed and extending further outwardly than said inwardly directed edge, whereby said inwardly directed edge will overlap the outwardly directed edge of an adjacent identical grid;
(c) each said ridge on the inner surface of said sheet having an integral planar support strip joined thereto by one of its edges;
(d) each said support strip having a free opposite edge parallel to its joined edge, all of said support strips being of substantially equal edge-to-edge width and extending parallel to the corrugations of said sheet and perpendicular to the plane of said sheet;
(e) said grid being intersected by at least one transverse drainage cut extending in depth from the free edges of said support strips outwardly through part of said corrugated sheet into said grooves on the outer surface thereof and extending in a transverse direction across at least some of said support strip; and
(f) said grid being flexible in a direction perpendicular to the said corrugations.

5. A drainage bed for a drum filter comprising:
(a) a plurality of grids of claim 3 collectively surrounding the entire lateral surface of the filter drum and in contact therewith;
(b) each of said grids being assembled to the two grids adjacent thereto by overlapping said outwardly directed edge of each said grid with the inwardly directed edge of the adjacent grid;
(c) means for securing said grids to said filter drum; and
(d) means for discharging the filtrate passing through said grids from the lateral surface of said filter drum.

6. A drainage bed for a drum filter comprising:
(a) a plurality of grids of claim 4 collectively surrounding the entire lateral surface of the filter drum and in contact therewith;
(b) a plurality of means extending the entire length of the lateral surface of the filter drum and parallel to the axis thereof for separating said drainage bed into a plurality of filter sectors to which vacuum, atmospheric pressure and blow-back may be independently applied;
(c) means for securing said grids and said separating means to said filter drum; and
(d) means for discharging the filtrate passing through said grids from the lateral surface of said filter drum.

7. A drainage bed for a drum filter comprising:
(a) a plurality of grids of claim 4 collectively surrounding the entire lateral surface of the filter drum and in contact therewith;
(b) a plurality of means extending the entire length of the lateral surface of the filter drum and parallel to the axis thereof for separating said drainage bed into a plurality of filter sectors to which vacuum, atmospheric pressure and blow-back may be independently applied;
(c) each grid within each said sector being assembled to each adjacent grid within said sector by overlapping the outwardly directed edge of each said grid with the inwardly directed edge of the adjacent grid;
(d) means for securing said grids and said separating means to said filter drum; and
(e) means for discharging the filtrate passing through said grids from the lateral surface of said filter drum.

8. A drainage bed for a drum filter comprising:
(a) a plurality of grids of claim 4 collectively surrounding the entire lateral surface of the filter drum and in contact therewith;
(b) each of said grids being assembled to the two grids adjacent thereto by overlapping the outwardly directed edge of each said grid with the inwardly directed edge of the adjacent grid;
(c) at least one of said support strips in a plurality of said grids being without any drainage cut whereby a plurality of integral division strips are provided for separating said drainage bed into a plurality of filter sectors to which vacuum, atmospheric pressure and blow-back may be independently applied;
(d) means for securing said grids to said filter drum; and
(e) means for discharging the filtrate passing through said grids from the lateral surface of said filter drum.

References Cited by the Examiner

UNITED STATES PATENTS

| | | | |
|---|---|---|---|
| 2,068,511 | 1/1937 | Raisch | 210—404 X |
| 2,285,894 | 6/1942 | Brooks | 210—541 |
| 3,013,666 | 12/1961 | Krynski | 210—402 X |

FOREIGN PATENTS

| | | |
|---|---|---|
| 863,368 | 3/1961 | Great Britain. |

REUBEN FRIEDMAN, *Primary Examiner.*

HARRY B. THORNTON, *Examiner.*